United States Patent

Bolanos et al.

[11] Patent Number: 5,965,078
[45] Date of Patent: Oct. 12, 1999

[54] METHOD FOR MANUFACTURING PREPACKAGED MOLDING COMPOUND FOR COMPONENT ENCAPSULATION

[75] Inventors: Mario A. Bolanos, Plano; Jeremias L. Libres, Dallas, both of Tex.; Tay Liang Chee, Singapore, Singapore; Ireneus J. T. M. Pas, Rozendaal, Netherlands

[73] Assignee: Texas Instruments Incorporated, Dallas, Tex.

[21] Appl. No.: 08/962,694

[22] Filed: Nov. 3, 1997

Related U.S. Application Data

[62] Division of application No. 08/641,982, May 2, 1996, Pat. No. 5,888,443.

[51] Int. Cl.⁶ .......................... B29C 31/06; B29C 45/02; B29C 70/70
[52] U.S. Cl. ............................... 264/272.17; 264/328.5; 264/328.4
[58] Field of Search .................. 264/328.4, 328.5, 264/272.11, 272.15, 272.17, 276, 264; 425/116, 544

[56] References Cited

U.S. PATENT DOCUMENTS

| | | |
|---|---|---|
| 3,754,070 | 8/1973 | Dunn et al. |
| 4,900,501 | 2/1990 | Saeki et al. ................ 264/272.17 |
| 4,946,633 | 8/1990 | Saeki et al. ................ 264/272.17 |
| 5,043,199 | 8/1991 | Kubota et al. .............. 264/328.5 |
| 5,059,379 | 10/1991 | Tsutsumi et al. ........... 264/272.17 |
| 5,061,164 | 10/1991 | Saboda et al. .............. 264/272.17 |
| 5,098,626 | 3/1992 | Pas ............................. 264/325.5 |
| 5,302,101 | 4/1994 | Nishimura .................. 264/272.17 |

*Primary Examiner*—Angela Ortiz
*Attorney, Agent, or Firm*—Mark E. Courtney; W. James Brady II; Richard L. Donaldson

[57] ABSTRACT

A method and apparatus for providing a prepackaged mold compound for use in encapsulating integrated circuit die and leadframe assemblies. A piece of mold compound 71 is placed in a receptacle 91 in a bottom mold chase 83. The receptacle 91 is coupled to a group of die cavities 85 by runners 87. Leadframe strip assemblies containing leadframes, integrated circuit dies, and bond wires coupling the leadframes and dies are placed over the bottom mold chase 83 such that the integrated circuit dies are each centered over a bottom mold die cavity 85. A top mold chase 93 is placed over the bottom mold chase and the prepackaged mold compound 71. The prepackaged mold compound 71 is a piece of mold compound 73 packaged in a plastic film which has sealed edges 77. The edges are peelable seals, which are released during the molding process. The mold compound 73 is then forced through the seals during the molding process by the pressure applied by a plunger 101. The plunger 101 can be applied using variable speed and pressure to control the rate the mold compound 73 fills the cavities in the top and bottom mold chases, thereby avoiding voids in the completed packages and minimizing wire sweep of the bond wires of the integrated circuit assemblies.

4 Claims, 6 Drawing Sheets

METHOD FOR MANUFACTURING PREPACKAGED MOLDING COMPOUND FOR COMPONENT ENCAPSULATION

This is a Division of application Ser. No. 08/641,982, filed on May 2, 1996, now U.S. Pat. No. 5,888,443.

FIELD OF THE INVENTION

This invention relates generally to the field of integrated circuits, and more particularly to the encapsulation packaging of integrated circuits using transfer molding techniques.

BACKGROUND OF THE INVENTION

In producing integrated circuits, it is desirable to provide packaged integrated circuits having plastic or resin packages which encapsulate the die and a portion of the lead frame and its leads. These packages have been produced a variety of ways, a few of which will be described here.

Conventional molding techniques take advantage of the physical characteristics of the mold compounds. For integrated circuit package molding applications, these compounds are typically thermoset compounds. These compounds consist of an epoxy novolac resin or similar material combined with a filler, such as alumina, and other materials to make the compound suitable for molding, such as accelerators, curing agents, fillers, and mold release agents.

Transfer molding operations have three stages which correspond to the three phases of viscosity. First there is a preheat stage required to move the mold compound from its hard initial state to the low viscosity state. Second is a transfer stage, where the compound is low in viscosity and easily transported and directed into cavities and runners. This transfer process must be rapid and be completed before the mold compound begins to set. Finally there is a cure stage that occurs following the transfer stage.

There are several critical requirements that must be met in a commercially successful package molding operation. For example, the cavities must be completely and uniformly filled, the so-called "balanced fill" requirement. Using conventional single plunger molds of the prior art, the balanced fill is difficult to perform uniformly across the large mold using the single pot and the long primary runners to transport the mold compound. A problem commonly observed in a single plunger, single pot mold operation using such a mold is an unacceptable void rate. Voids are areas within the mold cavity that are not filled with compound. These can be areas where the compound fails to flow or where air or other materials are trapped and cause hollow spaces in the packaged part. Voids can be produced if the transfer rate of the mold compound is too slow during the molding process or if air or moisture is trapped in one or more the cavities during the transfer stage.

A second critical requirement is that the wire sweep defect rate be minimized below an acceptable level. Wire sweep occurs as the mold compound enters the cavity through the gates. The mold compound is dense and pulls at the fine wires that couple the bond pads of the die to the leads of the lead frame. These wires will bend under the pressure due to the flow of mold compound. As an example, suppose that in a typical lead frame and die assembly for a high pin count device, an average wire sweep after packaging of less than 6% is specified. A straight line from the lead frame lead to the bond pad has a sweep of 0%. So if after assembly and mold any wires on a packaged unit are found to have more than 6% sweep, the unit is out of specification, and is considered to be a defective unit. Wire sweep is specified as a maximum allowable parameter and is of considerable concern in production of integrated circuits, because if the bond wires are moved too much, a wire short between two or more adjacent bond wires often occurs. Alternatively, bond wires sometimes break away. Either condition results in a faulty unit.

Although the wire sweep defect rate which is observed in the single plunger molding presses is adequate for producing low to moderate pin count DIP and flat quad packaged devices, as the device pin counts continue to increase and lead frames become finer in lead to lead pitch, the wire sweep parameter becomes increasingly critical. While it is possible to build 200 pin flat quad devices using these techniques, as the pin count goes towards 400 pins and beyond, the pitch between leads will become smaller, and the prior art transfer molding presses using a single mold pot will no longer be economically suitable, due to the low yield and high wire sweep defect rates.

A further disadvantage with a single plunger mold and pellet compound arrangement is that the performance in the two critical areas are inversely dependent on each other. That is, in attempting to perfect the molding process using a single plunger mold, it has been observed that steps taken to reduce wire sweep defects typically increase the void rate, and vice versa. In other words, if the wire sweep defect rate is lowered the void rate tends to increase. The wire sweep rate can be lowered, for example, by slowing the transfer rate of the mold compound into the cavities. This tends to increase the void rate. Voids can be reduced by increasing the flow rate into the cavities, but this will tend to increase the wire sweep defect rate.

It has been further observed that the wire sweep and void problems tend to be more severe as the number of cavities and the distance of runners increases. Nonuniform fill can occur along a lengthy runner having many cavities. The cavity closest to the pot will have a faster fill rate than the others. The cavity farthest from the pot will tend to fill at the end of the transfer period, and the rate will be lower because a lot of the compound has been diverted to other cavities and because the compound is starting to harden. As a result, difficult and time consuming fine tuning of each mold press is required to establish an operation mode which will fill all of the cavities at an acceptable rate, during the low viscosity period, without increasing wire sweep defects to an unacceptable level, particularly for those cavities closest to and farthest from the mold pot.

Further, the use of the thermoset molding compound results in a process where the sprue, flash or waste that remains in the pot, the runners and between the devices themselves cannot be reused. Thermoset materials can only be used once in a molding operation, so the excess material must be discarded. Thus the sprue and waste left in the long runners and in the mold pot cannot be recycled, making waste particularly costly.

Also, the conventional molding compound acts as a strong abrasive. During molding, the mold compound is forced out of the mold pot and into the primary runners. The abrasive nature of the mold compound results in rapid wear of the mold pot and the runners, and the plunger or ram itself. This results in expensive rework or replacement of the mold chases and plungers on a frequent basis.

An alternative prior art approach for reducing the problems known to the single plunger molding presses of the prior art is to construct a multipellet, multiplunger mold station to replace the single plunger system.

In a multiplunger molding operation, each of the many mold pots receives a so called "mini-pellet" of mold compound. Each mold pot serves only a few cavities, typically one or two cavities. The press is a more complex press than that of the single plunger mold, and has a plunger for each of the mold pots. The plungers may operate from the top or from underneath the mold.

The individual plungers are used to start the transfer process, the cavities fill with mold compound as the plunger is pushed into the mold pot, and the transfer phase is completed in a few seconds.

The multiplunger mold process has some advantages over the single pot molding process. The use of the smaller pellets and the shorter runs eliminate the long runners and nonuniform fill times associated with a single plunger press. The pellets used are smaller and therefore do not require preheating, as the mold platens can provide sufficient heat to transition the mini-pellets into the low viscosity state. The wire sweep defect rate can be lowered by providing exact control of the plunger or ram insertion rate, so that the fill is done at a speed which prevents voids while minimizing wire sweep problems.

An automated multiplunger press controller can be added that can individually vary the operation of each plunger, if necessary, to obtain optimal results.

The nonuniform fill and wire sweep problems associated with the cavities nearest and farthest from the single center pot of the single plunger mold presses are reduced or eliminated. Mold compound waste is reduced by the shorter runners.

The disadvantages of the multiplunger molding process are primarily that it requires the use of the mini-pellets. The mini-pellet form of the molding compound is far more expensive than per kilogram than the single large pellets used by the single transfer mold. Also, the multiplunger molding station is extremely expensive to manufacture, operate and maintain. The automation of a press with so many plungers is more complex and expensive than the single mold press.

In addition to the added costs, the multiplunger molding station has a lower parts per hour throughput than for a conventional single pot mold press. The multiple plunger molding system requires complex control and loading and unloading mechanisms. The result is that each station has lower overall throughput than a single plunger mold station, although tighter process control can be achieved. Because the throughput is lowered, additional stations are needed to maintain the same relative level of productivity. High productivity is required to keep the unit costs low. The need for additional expensive and complex molding stations increases the cost disadvantages for the multiplunger molding systems.

Both single plunger and multiplunger mold presses have other disadvantages that are common. The mold compound is an abrasive material. The mold pot and the primary runners receive an abrasive force each time the press is operated. These areas wear quickly and the expensive mold chases must be replaced periodically as a result.

Also, both processes require pelletized mold compound. This material is fairly difficult to produce in the large form, and even more expensive to produce in the minipellet form. The compound is extruded into a rod, which is powdered, and the powder is then pelletized. This is an expensive and complex manufacturing process.

Both pellets and mini-pellets are subject to contamination by moisture and air. It is necessary to perform the molding process under pressure to elimiate trapped air and prevent the formation of voids. Moisture can become trapped in either form of pellet. Moisture contamination of the molding compound can result in additional voids and scrapped devices. Moisture contamination also contributes to package cracking during cure and afterwards to early failure of devices.

U.S. Pat. No. 5,098,626, issued Mar. 24, 1992, and entitled "Method for Packing a Measured Quantity of Thermosetting Resin And Operating a Mold for Encapsulating a Component", and herein incorporated by reference, provides another alternative wherein the mold compound is packaged in individually sealed units. These units each contain liquid mold compound in a quantity needed for a single cavity or pair of cavities for integrated circuit packages. Each package is a bag or tube containing liquid mold compound and ending in a bulge or sprout. During molding the bulge or sprout is placed at the end of a runner which feeds a cavity. As the molding process begins, the sprout is cut and the mold compound is pressed out of the bag into the cavity by individual, multiple plungers.

The '626 patent approach is similar to a conventional multiplunger mold system in that small quantities of mold compound, each of which are individually loaded, are provided. The patent provides a moisture and contamination free packaging system which can be used with an automated loading system. However, like the mini-pellets, many of these bags are required for each run. The abrasion problems are reduced, because the pots and plungers are protected by the packaging. Also, improved uniform fill and reduced wire sweep are possible. But the throughput problems and increased expense for each molding station remain, and the costs for each press are increased further by the added complexity. Also, the packaging of the mold compound in small quantities each in an individual package may lead to an expensive raw material for molding.

Accordingly, a need thus exists for a mold compound and molding system which eliminates the problems of the prior art transfer molding systems while retaining a high throughput rate, low raw material costs, and which is simple to operate, maintain, and uses molding stations that are relatively inexpensive to build. The new system should be compatible with existing single pot transfer mold presses to allow a retrofitting of existing integrated circuit assembly lines. The system should reduce waste of mold compound and reduce the abrasive impact of the mold compound on the equipment used. The new molding system should provide uniform cavity fill and reduced wire sweep defect rates.

The new molding compound should be free of impurities, air and moisture to reduce void and package cracking problems. It should be in a form that is compatible with automatic loading and unloading systems. It should be premeasured and have excellent storage durability. It should be economically competitive with the pellets and mini-pellets of the prior art. The invention described herein addresses these needs.

SUMMARY OF THE INVENTION

A system for transfer molding the packages of integrated circuits using pre-packaged mold compound packaged in a protective plastic is provided. The plastic packaging is sealed at the edges by a heat seal or similar method that results in a peelable seal that opens during molding. As the package is heated in the mold, the edge seals become flexible. The mold compound can then be pushed through the edge seals at places adjacent to the mold runners during the transfer molding process. The protective packaging ensures that the mold compound is free from moisture and air contamination and is easily produced, stored and shipped. The mold and mold compound packaging are designed so that the packaged mold compound fits easily into the mold and is easily removed. The mold compound can be a variety of shapes and sizes as the particular mold design dictates.

In a first preferred embodiment, an improved mold design is used in combination with prepackaged mold compound inserts. The mold chases include rectangular receptacles for receiving the mold compound inserts. A rectangular plunger is provided for each of the receptacles. Each package cavity is equidistant from the receptacle containing mold compound, providing improved uniformity of fill and allowing for complete fill of the cavities with reduced wire sweep as compared to the transfer molds of the prior art. The rectangular plunger is inserted into the mold compound receptacle and the mold compound is forced through the edge seals of the protective packaging into short runners coupling the mold receptacle to the cavities. The number of devices packaged per run is increased because the mold pots of the single or multiple plunger molds of the prior art are eliminated, providing additional area for die cavities.

The mold compound insert is placed inside the mold receptacle within the protective package, so that the equipment abrasion problems associated with conventional prior art transfer molding operations are reduced or eliminated. Since the runners are shortened, the amount of mold compound which is flash or sprue for each run is reduced, thus reducing waste and lowering production costs. The improved mold design is compatible with existing automated pick and place loading and unloading systems for increased automation and improved throughput. The molding station requires only a few plungers and is inexpensive to build and to maintain. Existing molding equipment may be retrofitted to use the new system. The mold system is easily combined with a process controller to achieve tight process control, and the use of the prepackaged mold system with a process controller results in a mold process with balanced cavity fill, reduced wire sweep and low void defect rates.

BRIEF DESCRIPTION OF THE DRAWINGS

Corresponding numerals are used for corresponding elements in the drawings, unless otherwise indicated in the text.

DETAILED DESCRIPTION OF PREFERRED EMBODIMENTS

Figure 1:
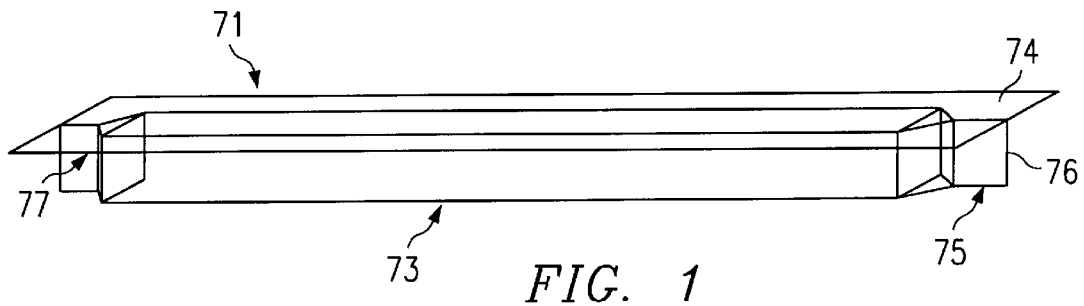
FIG. 1 depicts a prepackaged mold compound package of the invention.

FIG. 1 depicts a prepackaged mold compound insert 71 in a first preferred embodiment of the mold compound of the invention. Many other shapes are possible and will still obtain all of the advantages of the molding system of the invention. The mold compound 73 may be composed of conventional resin or resin filler mold compound in a solid or semi-solid form. Alternative molding compound compositions may be used. The mold compound 73 may be made from powdered conventional mold compound, or preferably directly from extruded mold compound, thereby eliminating the need for the expensive pelletizing steps required for the pellets of the prior art mold compounds.

The mold compound 73 is packaged in a prepackaged plastic package. Sleeve 75 surrounds three sides of the compound and the ends. Ends 76 of sleeve 75 are sealed. The compound 73 is covered by top 74, which is a piece of plastic film which is wider than the mold compound 73 and provides a lip on either side of the mold compound 73. Sleeve 75 is a second piece of plastic film that wraps around the sides and bottom of the mold compound 73 and is sealed at the ends 76. Edges 77 are seals that couple the sleeve 75 to the top 74. Sleeve 75 and top 74 may be of the same material or of differing materials.

The plastic package of FIG. 1 may be composed of many materials, but the material must meet certain requirements. The package should not crack or become permeable during storage or before molding within the specified temperature ranges for storage. The seal at the edges 77 should not degrade during storage, at least the seal at the edges should not become penetrable during storage so that the mold compound leaks or is contaminated by substances coming into the package. The seal at the ends should also remain impenetrable during storage. The package should be able to maintain a vacuum during storage. The package should not contaminate the equipment or the environment during storage or during the molding process.

The plastic package 71 of FIG. 1 provides the advantages of making the prepackaged mold compound inserts impervious to contaminants such as water that could interfere with the molding process and the reliability of the -resulting packages. Since the inserts are self-packaged in plastic, storage and shipping packing materials may be inexpensive and no additional protective layers may be needed. The protection of the mold compound from moisture prevents many of the package cracking problems and voids associated with moisture contaminated mold compound. The top 74 may be opaque and may carry labeling information in text and machine readable forms, such as bar codes or universal product code (so-called UPC) labels. This labeling on the mold compound package 71 provides an easy mechanism for checking that the correct type of mold compound is being used for a particular packaging operation. Also, the plastic packaging affords the opportunity to use alternative mold compounds instead of the resin or resin filled compounds known to the prior art, because the mold plunger and mold receptacle or pot are not in direct contact with the compound.

Figure 2:
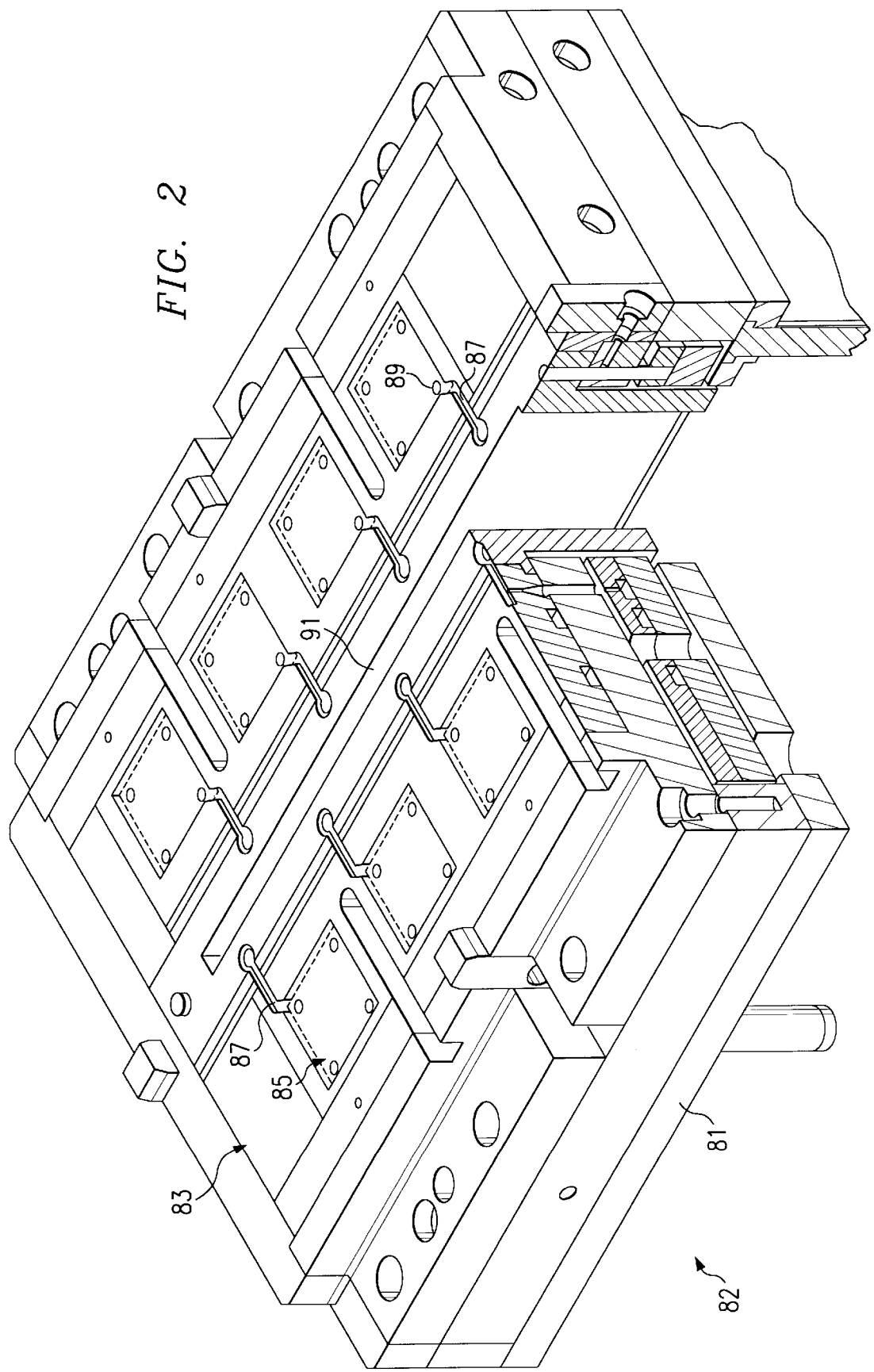
FIG. 2 depicts a bottom mold chase of the mold system of the invention.

FIG. 2 depicts a portion of a bottom chase for transfer molding integrated circuit packages, such as, for example, DIP or flat quad package type high pin count integrated circuit packages, using the mold compound package of FIG. 1. Bottom mold chase 81 holds two cavity bars 83, each of which has several die cavities 85 coupled to primary runners 87, and each cavity having a gate 89. A rectangular mold compound receptacle 91 is provided that extends through the mold cavity bars 83 and the mold chase 81. This receptacle 91 is open at the bottom for allowing a plunger or ram to enter the mold chase and to apply pressure to a mold compound package of FIG. 1 resting at the top of receptacle 91, to force the mold compound into the runners and the cavities. A typical mold system would include two to four of these mold chase pairs 81, so it would have two to four receptacles 91, and a corresponding array of cavities along both sides of each receptacle. For certain types of packages, as many as six to eight chases may be required for a single mold.

Figure 3:
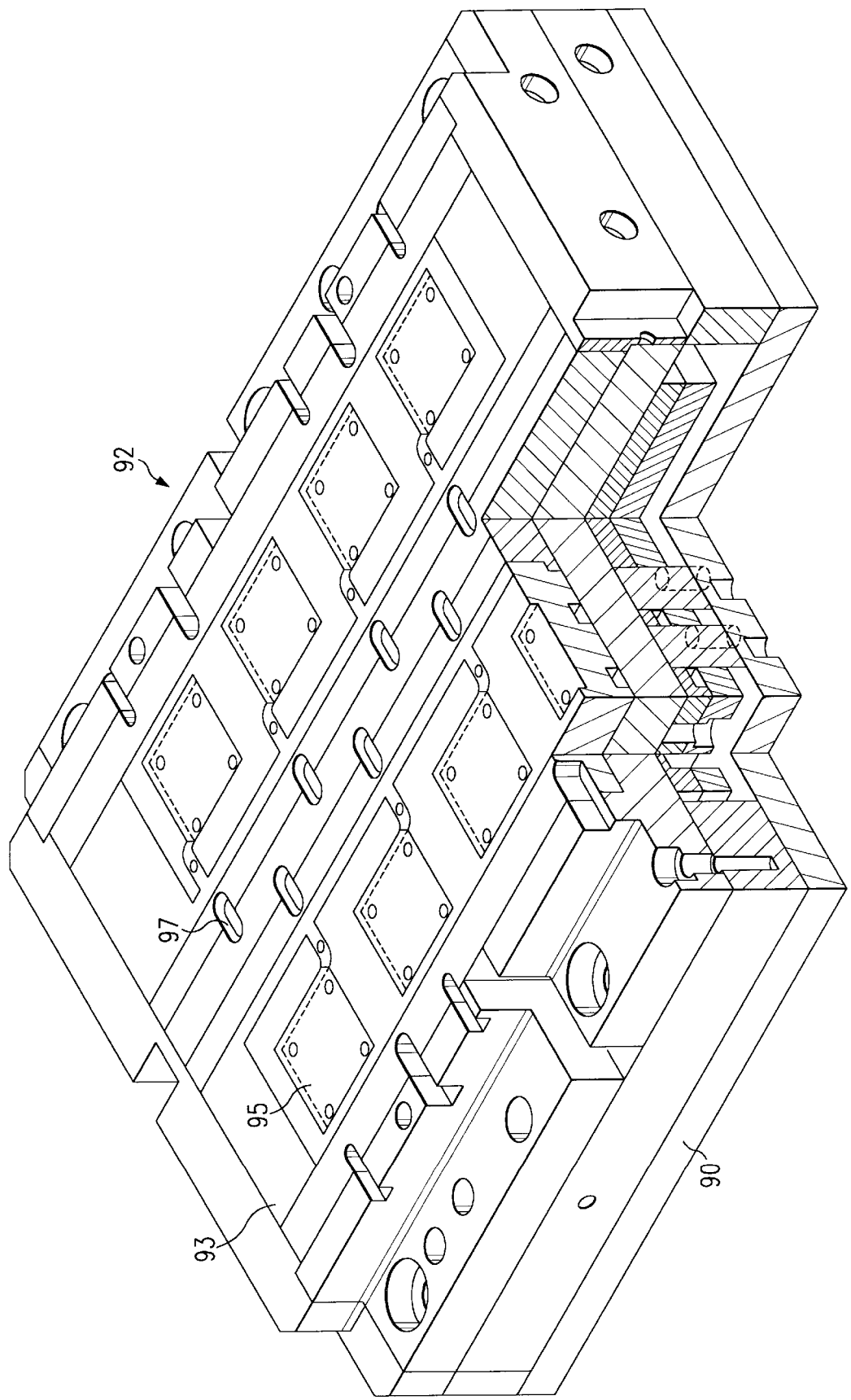
FIG. 3 depicts top mold chase of the mold system of the invention.

FIG. 3 depicts a portion of a top mold chase 92 for use with the bottom mold chase 81 of FIG. 2 and the mold compound package of FIG. 1. In FIG. 3, top mold chase 92 carries mold cavity bars 93, each of which includes a row of cavities 95 which are positioned to be placed over the bottom mold chase cavities 87. Delivery runners 97 are positioned with an outer end which will meet an associated primary runner 87 in the bottom mold chase, and an inner end which will lie over the mold compound receptacle 91.

Figure 4:
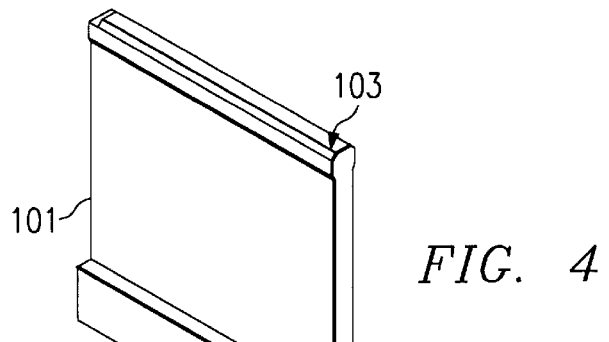
FIG. 4 depicts the plunger used with the top and bottom mold and the prepackaged mold compound of the invention.

FIG. 4 depicts the plunger 101 which is used with the top mold chase 92 of FIG. 3 and the bottom mold chase 82 of FIG. 2. The top of plunger 101 is sized so as to fit within the receptacle 91 in the bottom mold 82. The top of the plunger is operable to compress the mold compound package against the top mold chase 92 in an even manner along the insert of mold compound in the manner described below. The top of plunger 101 is beveled and machined so that a small area at the edge of the top and sides are spaced beneath the top surface a short distance to form tip 103. The tip 103 compressed against the sides of the plastic package and as the plastic is compressed, the plastic can deform into this spacing and the package will continue to compress without holding the top surface of plunger 101 away from the top mold surface.

In operation, the pre-packaged mold compound molding system including the packaged mold compound shown in FIG. 1, the bottom mold chase of FIG. 2, the top mold chase of FIG. 3, and the plunger of FIG. 4, operates as follows. The mold is opened so that the top mold and top mold chase is separated from the bottom mold and bottom chase and the bottom mold cavity bars 83 may be accessed from above. Lead frame strips having lead frame and die assemblies are placed over the bottom mold cavity bars 83 such that a single leadframe and die with its bond wires is centered over each cavity 85. A packaged mold compound insert 71 is placed in each receptacle 91 in the bottom mold. These placements are preferably performed by an automatic pick and place mechanism as is known in the prior art, but alternatively may be performed manually.

The bottom and top mold chases 83 and 93 are heated as in the conventional transfer molding stations, and the heat in the mold itself is sufficient to transition the mold compound into the transfer phase without preheating, so the preheating step required with the prior art single pot molding press is eliminated.

After the bottom mold chases 83 are loaded and the molding inserts are in place in the bottom mold receptacles, the mold is closed and the top mold chases are brought into contact with the leadframe and die assemblies and the mold compound packages. Runners 97 in the top mold chases 93 are now positioned so that the inside ends of these runners are positioned over the edges of the mold compound within the receptacles 91.

The mold compound packages may be heated for a short time to reach the low viscosity state. While this heating is taking place, the heat seal in edges 77 of the molding compound pencil packages opens, that is the heat relaxes the seal so that the seal is now penetrable by the mold compound. The mold is typically heated to a temperature of 175 degrees Celsius when conventional resin or resin filler molding compound is used in either powdered solid or liquid states.

Figure 10:
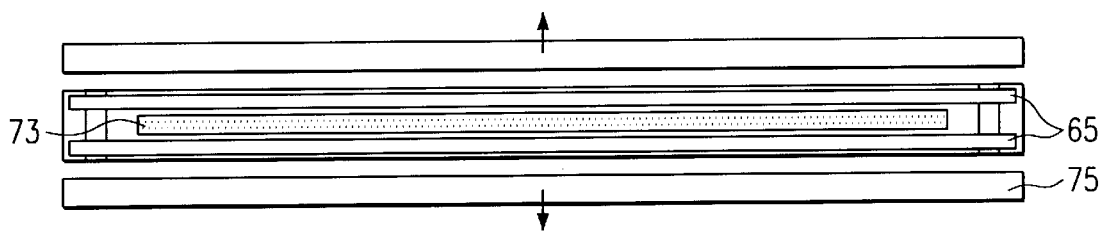
FIG. 10 depicts one of the steps of the process of making the mold compound of the invention.

After the heat seals are relaxed and the mold compound enters the low viscosity state, the plunger 101 of FIG. 10 is applied. In a preferred embodiment, the plunger 101 travels through the bottom mold chase and into the bottom mold receptacles 91, compressing the mold compound inserts 71 from underneath. Alternatively, the inserts could be compressed from above, with the receptacles formed in the top mold platen. In this case the mold compound inserts would be loaded with the top plastic layer 74 down, that is adjacent the bottom mold chases. Either arrangement will work to transfer the mold compound into the primary runners.

In this embodiment, the mold compound is compressed by the action of the plunger 101 and as it is compressed the mold compound will begin to push at the edges of the receptacle 91, and the mold compound will push at the edges of the mold compound package. As the only exits available to the mold compound are the delivery runners 97 in the top mold cavity bars 93, the compound will pass through the now penetrable heat seal at the edge of the plastic package 71 and into the runners 97. The delivery runners each feed a primary runner 87 in the bottom mold chases 83. A circular coupling area at the inner end of the primary runners meets the outer end of the delivery runners 97, and the mold compound is transferred to the primary runners 87. The mold compound then enters the cavities 85 over the gates 89, and begins filling the individual package cavities 85.

After the cavities are filled with the compound, the molding process continues as a conventional transfer molding process. After the packages are cured, if required for the particular molding compound, the top mold is moved away from the bottom mold. Small plungers, not shown in the figures, are activated to release the packaged devices from the cavities 85, and the sprue or flash is released from the runners 87. The mold compound package is now almost empty and resting in the receptacle 91, and it too is removed. The need to clean the receptacle 91 and the plunger 101 is greatly reduced over prior art molding systems because the packaging of the mold compound insert 71 serves to isolate the plunger 101 and the receptacle 91 from the mold compound.

A critical element to the operation of the molding process using the prepackaged molding compound is the packaging material. The requirements for the packaging of the mold compound have been established for an integrated circuit assembly process using industrial standard requirements for molding compounds and for the resulting integrated circuit packages. The plastic package should not create appreciable residue or glue like substances in the mold during molding. The mold compound packaging should not contaminate the mold runners or receptacle. The material used in the packaging should not add to ionic contamination of the resulting packages, that is the material should not have an ionic content higher than that of the molding compounds in use in the integrated circuit packaging art. The packaging material should melt during the molding process, so it must have a melting temperature at least ten degrees Celsius over the molding temperatures. Typically, the material needs to have a melting point of greater than 200 degrees Celsius. The material should only allow the molding compound to exit the package at selected points adjacent to the runners, and it should not open prematurely during the preheat phase of the molding operation. So the edge seals should not open and emit molding compound prematurely. However, once the edge seals are penetrable the mold compound should be able to flow out of the package with a minimum of resistance to flow. The material should not tear in normal handling or shipping, but should have the capacity to stretch into the runners when compressed during the molding process as described above. The material should be capable of vacuum sealing and of maintaining the vacuum during storage.

Plastic films, such as those used in food storage, freezing and preparation, are particularly well suited to this application. The melting point, strength, vacuum capability and moisture and air barrier requirements for the mold compound packaging are all met by such films. The films are inexpensive and easy to purchase and use in a production environment. One preferred film is MYLAR™ polyester film, such as for example MYLAR™ 40 XM 963-AT, a polyester film for packaging available from E. I. Du Pont, Du Pont de Nemours Int. S.A., Geneva, Switzerland; or Du Pont (U.K) Ltd, Maylands Avenue, GB-Hemel Hempstead, England. Another preferred film is sold under the trade name ICI™. Similar films are commercially available from a variety of vendors. The top and sleeve films can be of differing material so long as a good edge seal, which is impenetrable during storage and handling and becomes penetrable either under heat or pressure or both, can be made between the two materials.

Figure 5A:
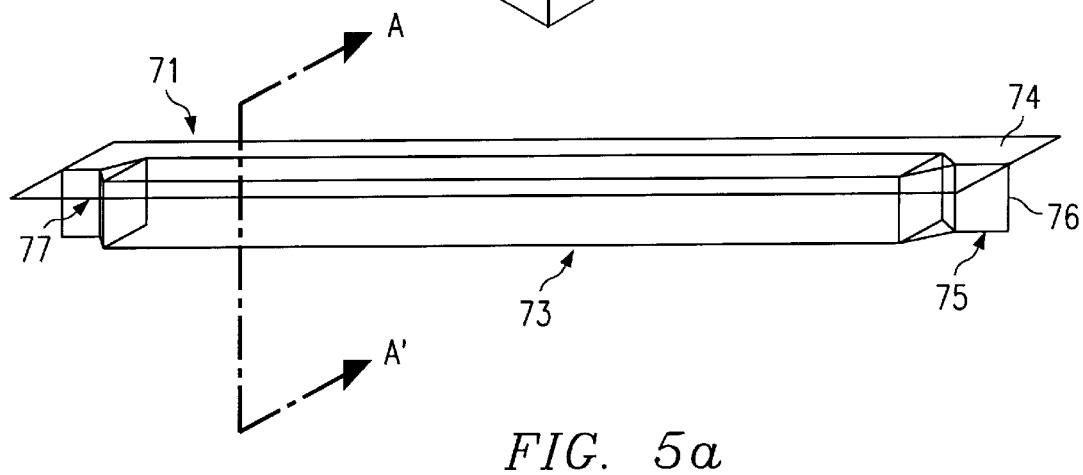
FIG. 5a depicts a completed mold compound package of the invention.
Figure 5B:
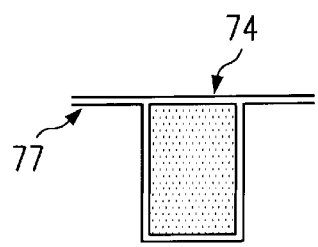
FIG. 5b depicts a cross section of the completed mold compound package.
Figure 5C:
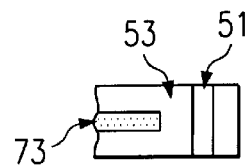
FIG. 5c depicts the details of an end seal of the completed mold compound package of the invention.

Once the appropriate material is selected, the film must be applied to the mold compound to create the necessary packaged mold compound insert. FIGS. 5a, 5b and 5c depict in some detail the completed, packaged mold compound insert.

FIG. 5a depicts the completed mold compound insert. Package 71 is a plastic polyester film package of two pieces, a lid and a top. Ends 75 are permanently sealed. Pencil shaped mold compound 73 is typically, although not restricted to, a resin filled or resin mold compound as known in the art. Alternatives include epoxies, plastics, and other encapsulants.

FIG. 5b depicts the cross section taken along line A—A of FIG. 5a. Edge 77 forms a seal between the sleeve 75 and the top 74. This seal becomes penetrable during the transfer phase of the molding process, and so should release under heat, pressure, or both heat and pressure. The seal acts as a barrier to moisture and air and other contaminants during shipping, storing and normal handling of the mold compound. A heat seal formed between sleeve 75 and top 74 has been found to be an effective embodiment. Alternatives include adhesives such as glues and tapes, and pressure seals. The seal should not restrict flow of the compressed mold compound once the seal is opened for the transfer process. The seal should not contaminate the mold, that is when the package is removed after the molding process the seal should be with or inside the package and not attach itself to the plunger or mold surfaces.

FIG. 5c depicts a detailed view of one end of the package 71. Mold compound 73 terminates before the end of sleeve 75. A crimped end 53 brings the ends of sleeve 75 together. End 53 is sealed with sealant 51. In a preferred embodiment, sealing tape such as a double sided tape is used. Again these tapes are but one alternative, glues, pressure, heat, and other sealing techniques may be used. The end seal should remain in place up to a temperature of about 180 degrees Celsius. The end seal should be applicable quickly and in a vacuum environment. The end seal should not contaminate the mold or other equipment, and should adhere to the film material. A preferred embodiment uses precut pieces of double sided sealing tape. Alternatives are epoxies, adhesives, sealing compounds, heat seals, crimped seals and other well known seals for plastics.

Figure 6:
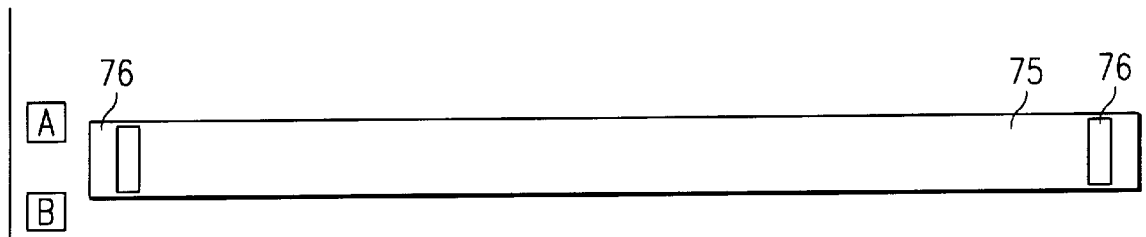
FIG. 6 depicts one of the steps of the process of making the mold compound of the invention.

FIGS. 6–11 show the steps performed to manufacture the packaged molding compound insert shown in FIGS. 1 and 5a–c. In FIG. 6, the application of the end seals to a polyester film sleeve 75 cut to an appropriate length is shown from a top view perspective. The end seals 76 are placed on the upper surface of sleeve 75 in FIG. 6, which will become the interior surface of sleeve 75 ion the completed package. Labels A and B are provided as orientation references for subsequent illustration and discussion in the following drawings.

Figure 7:
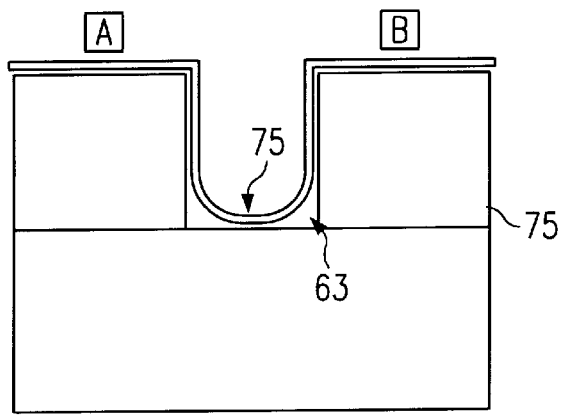
FIG. 7 depicts one of the steps of the process of making the mold compound of the invention.

FIG. 7 shows the sleeve 75 placed into a loading block 61 for receiving the mold compound. FIG. 7 is an end view, and labels A and B from FIG. 6 are repeated in FIG. 7 to clarify the orientation of the film sleeve 75 in FIG. 7. Cavity 63 is of a width and depth determined by the size of the finished package as needed for the particular molding operation. Sleeve 75 is placed so that the sides are extended out to form a lip on either side of the top of cavity 63 in loading block 61.

Figure 8:
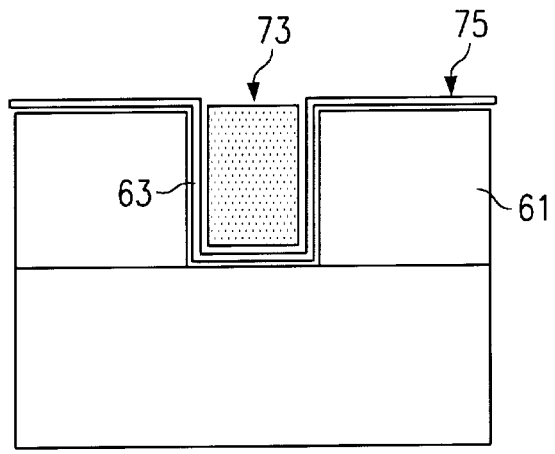
FIG. 8 depicts one of the steps of the process of making the mold compound of the invention.

FIG. 8 repeats the end view of FIG. 7 and shows the sleeve 75 now receiving the piece of mold compound 73. The cavity 63 is shaped to receive the mold compound 73 and so the sleeve 75 now pushes into the corners of cavity 63.

Figure 9A:
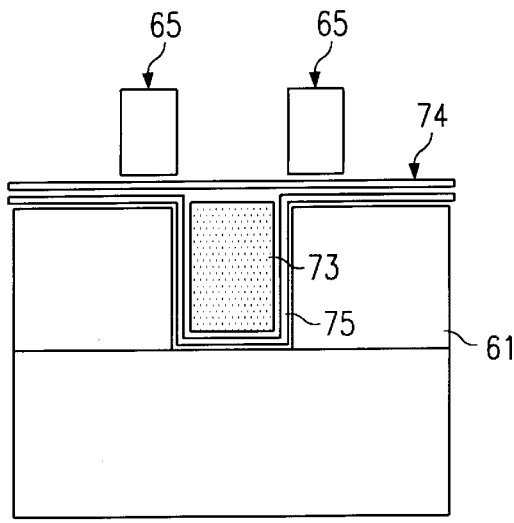
FIGS. 9A and 9B depict one of the steps of the process of making the mold compound of the invention.
Figure 9B:
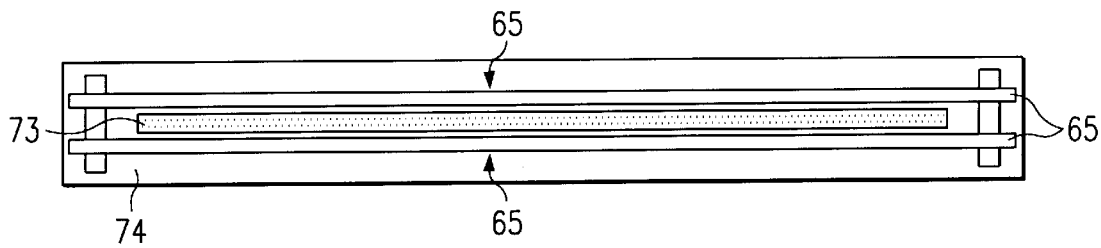

FIGS. 9a and 9b show the formation of the heat seals between the top film piece and the sleeve of the plastic film package. FIG. 9a is another end view as are FIGS. 6 and 7. FIG. 9b is a top view. To form the heat sealed edges of the package the following steps are followed. Top piece 74 is placed over the sleeve 75, compound 73, and loading block 61. Sealing blocks 65 are then placed over the top 74 a short distance away from the top edges of cavity 63. Heat is applied to sealing blocks 65 for the time required to cause sleeve 75 and top 74 to become sealed together in the heated region. The heat seals are unaffected by moisture and other contaminants but should become penetrable when the seals are again heated.

FIG. 10 depicts the package film cutting step. After the heat seals are complete, lengthwise cuts in the edges of sleeve 75 are made outside the area of the heat seals. The width of the top 74 is determined by the mold design to be used, as the lip formed by the top 74 is used to hold the mold compound in the proper place in the mold receptacle during the molding process. Variations in the receptacle and mold design are easily accommodated by varying the mold compound package top 74 width at this cutting step.

Figure 11:
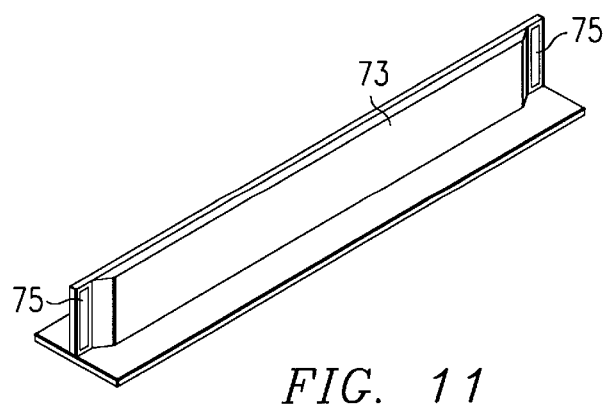
FIG. 11 depicts one of the steps of the process of making the mold compound of the invention.

FIG. 11 depicts the result of the next step required to make the packaged mold compound, the vacuum sealing step. The mold compound 73 with the sleeve 75 still open at the ends is placed into a vacuum chamber. The vacuum is reduced to a pressure of about 20 millibars. The end seals are then mechanically sealed to form the package as shown in FIG. 11. Vacuum reduces or eliminates any air from the packaged mold compound insert. This is advantageous because air trapped between the package and the mold compound can be pushed out into the runners during the molding process and can create voids in the completed package. Alternatives to the vacuum sealing step include a tight wrapping step which would cause the plastic sleeve to tightly wrap the mold compound and prevent air from being packaged with it. Shrink wrapping could be used, for example.

Figure 12:
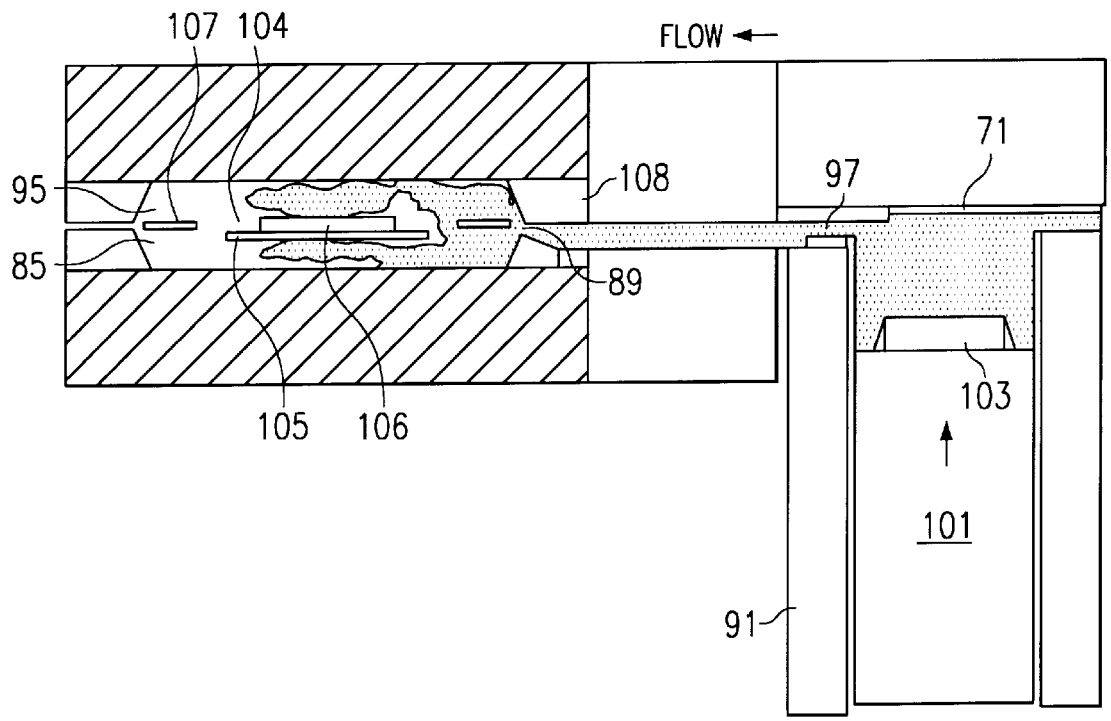
FIG. 12 depicts a cross sectional view of a transfer molding process using the prepackaged mold compound of the invention.

FIG. 12 depicts the transfer stage of molding using the prepackaged mold compound package of FIG. 11. In FIG. 12, prepackaged mold compound 71 is compressed by plunger 101 and tip 103. The mold compound is forced into delivery runner 97 and primary runner 87, and over gate 89. Integrated circuit die 106 lies on a die pad 105 inside the cavity 104 formed by top cavity 95 and bottom cavity 85, with leadframe 107 also inside the cavity 104.

In operation, the function of the beveled tip 103 can now be seen, as the plastic package sides are compressed into the slots machined into the plunger 101 so that the compression can continue without interference. The compound travels into the delivery runner 97, then into the primary runner 87, over the gate 89, and into the cavity 108 formed by the top and bottom chase cavities 95 and 85.

After the cavities 104 are filled with the compound, the molding process continues as a conventional transfer molding process. A curing time may be required to complete the packages, alternatively some mold compounds may instantly cure. After the packages are cured, the top mold is moved away from the bottom mold. Plungers are activated to release the packaged devices from the cavities 85, and the sprue or flash is released from the runners 87. The mold compound package 71 is now empty and resting in the receptacle 91, and it too is removed. The need to clean the receptacle 91 and the plunger 101 is greatly reduced because the packaging of the invention serves to isolate the plunger and the receptacle from the mold compound.

The plungers 101 are easily controlled with a variable rate of compression to achieve a tight process control parameter during the transfer phase. This process control leads to uniform fill of the cavities, which are evenly spaced and equidistant from the source of the mold compound, and the transfer speed can be controlled to eliminate voids while minimizing pad tilt and wire sweep defects. The transfer speed and transfer pressure can be controlled by fitting an independent process controller circuit to the mold system to allow multi-step, variable speed and variable pressure capability. This equipment can be retrofitted to an existing mold press.

Many advantages accrue as a result of using the prepackaged molding compound of FIG. 1 with a mold designed to efficiently use the prepackaged molding compound, such as the molding system of FIGS. 2–4. An advantage of the molding system of the invention is that is provides balanced fill capability. It can be seen from FIGS. 2 and 3 that each primary runner and secondary runner is the same length. Because the cavities are all equidistant from the source of mold compound, receptacle 91, the problems of nonuniform fill and wire sweep associated with the single pot mold systems of the prior art are eliminated using the molding system of the invention.

Further, because the mold compound 73 is prepackaged in a plastic encapsulation, the mold receptacle, the plunger, and to some extent the primary runners are protected from the abrasive mold compound, so that the wear rate is greatly reduced. This results in longer mold life and reduced repair and replacement costs over the life of the mold surfaces, thus lowering the unit cost.

It can further be seen that as another advantage of the use of the invention, the mold receptacle 91 takes a small amount of area compared to the large single pot and primary runners of the single pot transfer molds of the prior art. This is an advantage in that additional space is available for cavities and additional units may be molded during each run. The density for the system is improved over the prior art.

The mold design and mold compound is also compatible with existing autoloading systems for transfer molds, so that the mold system may be retrofitted into an existing automated transfer mold assembly line for a reasonable cost. The plunger design and mold design results in a need for two to four plungers per mold, which is cheaper to build and maintain than the multiple plungers needed for a mini-pellet multiple plunger system.

Further advantages are that the mold compound insert packages are reasonable in cost and may be produced in volume for a lower price per kilogram than the mini-pellets required by the prior art or the multiple packets required by the sprouted bag encapsulation system. It is believed that as the volume increases the mold compound inserts may be produced at a price similar to the pellets of the single pot molding systems of the prior art.

Because the throughput rate of the mold system is high, the number of stations required for a particular throughput rate is lower than the multiple plunger stations used with either the mini-pellet of the sprouted bag encapsulation systems of the prior art. Accordingly, the capital costs required to achieve a particular productivity level are less than either of these approaches.

Another advantage is that the molding system provides an efficient use of the molding compound. The runners are short from the receptacle to the cavities. The amount of mold compound left in the package can be minimized by careful design of the plunger so that all or almost all of the compound is transferred from the plastic package to the runners. The amount of sprue or flash left in the runners is far less than a single pot transfer mold and somewhat less than the mold compound waste resulting from a multiple pot multiplunger system.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of encapsulating an integrated circuit die and leadframe assembly, comprising the steps of:

providing a bottom mold chase having a plurality of cavities for defining a bottom surface of an integrated circuit package, each cavity being coupled to a mold compound receptacle by a runner, and each cavity having a gate to control the flow of mold compound into said cavity;

placing at least one leadframe strip over said bottom mold chase, each leadframe strip having a plurality of integrated circuit dies, the leadframe strip being positioned such that each one of said integrated circuit dies is positioned over one of said cavities;

providing a rectangular shaped piece of prepackaged mold compound and placing said piece into a receptacle in said bottom mold chase, said runners each providing a path from said receptacle to an associated one of said cavities, said runners being of approximately equal length;

placing a top mold chase over said bottom mold chase, said top mold chase having cavities associated with the cavities of said bottom mold chase and being positioned over said cavities of said bottom mold chase and said integrated circuit dies;

heating said top and bottom mold chases until the mold compound within said prepackaged mold compound reaches a low viscosity stage; and forcing said mold compound of out of said prepackaged mold compound into the runners and surrounding said integrated circuit dies and filling said cavities with mold compound;

wherein said step of providing a rectangular shaped piece of prepackaged mold compound comprises providing a piece of mold compound packaged in a plastic film that has a heat seal at the edges, and wherein said step of heating relaxes said heat seal such that the heat seal opens in response to said heating step and the mold compound may be forced through the heat seal under pressure by said forcing step.

2. The method of claim 1, wherein said step of providing a piece of prepackaged mold compound comprises providing a thermoset material packaged in a polyester plastic film.

3. The method of claim 2, wherein said step of providing a piece of prepackaged mold compound comprises providing a thermoset material packaged in a polyester plastic film capable of heat sealing.

4. The method of claim 2, wherein said step of providing a piece of prepackaged mold compound comprises providing a thermoset material packaged in a polyester plastic film further comprises the step of vacuum sealing said prepackaged mold compound.

* * * * *